US007293808B2

(12) United States Patent
Leske

(10) Patent No.: US 7,293,808 B2
(45) Date of Patent: Nov. 13, 2007

(54) FORKLIFT ROLLCAGE PROTECTORS

(75) Inventor: Thomas R. Leske, Oshkosh, WI (US)

(73) Assignee: S. - I. Incorporated, Oshkosh, WI (US)

( * ) Notice: Subject to any disclaimer, the term of this patent is extended or adjusted under 35 U.S.C. 154(b) by 177 days.

(21) Appl. No.: 11/120,713

(22) Filed: May 3, 2005

(65) Prior Publication Data
US 2006/0249985 A1 Nov. 9, 2006

(51) Int. Cl.
B60R 19/02 (2006.01)
B60R 19/18 (2006.01)
B60R 19/22 (2006.01)
(52) U.S. Cl. .................. 293/102; 296/190.03; 280/756
(58) Field of Classification Search ................. 293/121, 293/102, 117, 128; 296/190.03; 52/716.6, 52/717.05, 718.04; 280/756
See application file for complete search history.

(56) References Cited

U.S. PATENT DOCUMENTS 4,666,196 A    5/1987  McCoy et al.
4,688,846 A *  8/1987  Martin, Jr. .................. 296/102
5,283,096 A *  2/1994  Greenberg et al. ............ 428/67
6,416,095 B1*  7/2002  Keys et al. .................. 293/128
6,527,319 B1*  3/2003  Martel ......................... 293/128
6,679,520 B2*  1/2004  Kurata et al. ............... 280/733

* cited by examiner

Primary Examiner—Dennis H Pedder
Assistant Examiner—Melissa Black
(74) Attorney, Agent, or Firm—Wilhelm Law Service; Thomas J. Connelly; Thomas D. Wilhelm

(57) ABSTRACT

A forklift rollcage protector has a housing, attached to a forklift rollcage, and an insert which has a length dimension, an inwardly facing surface and an outwardly facing surface. The inwardly facing surface of the insert communicates with an outwardly facing surface of the housing. The outwardly facing surface of the insert faces generally outwardly away from the housing and the rollcage. The insert removably interfaces with the housing and generally attenuates scraping, cutting, and/or other wear of the rollcage.

23 Claims, 7 Drawing Sheets

FORKLIFT ROLLCAGE PROTECTORS

BACKGROUND

The present invention relates generally to "wear-protection" devices and more particularly to devices for protecting e.g. (i) tubing, (ii) extruded, cast, forged, machined, elongate members, and/or (iv) other elongates members, from grinding, scraping, cutting, abrading, and/or other wear.

Tubing and/or other elongate members are used in, for example, rollcages in vehicles. One such category of vehicles in which rollcages are often implemented is forklift vehicles.

A rollcage on a forklift vehicle typically includes cage-uprights, e.g. four generally upright pieces of tubing which extend upwardly from the chassis and/or body of the vehicle. The uppermost portions of the cage-uprights are connected to each other by generally horizontally oriented pieces of tubing. The upright and horizontal tubing members collectively generally define an enclosure structure which generally encapsulates the forklift operator.

Accordingly, the rollcage of a forklift provides the operator some protection in certain adverse situations. Exemplary of such adverse situations are roll-overs, side impacts, failings objects, and others.

Forklifts are used for lifting, lowering, and transporting objects, loads, and/or other goods, whereby they are particularly well suited for use in warehousing environments. Warehouses often include racking e.g. racks and/or series of racks, to enable a user to store goods vertically, which relatively increases the useful storage space of the available ground square footage as compared to a warehouse without racking.

Warehouse racking can be arranged in a variety of suitable configurations. Exemplary of such configurations are drive-in racking configurations and drive-through racking configurations. Drive-in and through racking configurations have rows which include aisles defined between adjacent upright structures of e.g. pallet racking. Each row is commonly used to store product all of a single, or various few, kind/sku.

The pallet racking has elongate L-shaped brackets, or rails, which extend along the length of the row and generally define the outermost perimeter of the respective aisle. In other words, the L-shaped brackets or rails each has a vertical rail portion, and a horizontal rail portion which extends outwardly into the aisle e.g. generally parallel to the ground.

In drive-in and through racking configurations, the distance between the L-shaped rails corresponds to the width of a pallet to be stored thereupon. And the distance between the edges of the horizontal rail portions, of the L-shaped rails on opposite sides of the same aisle, which extend furthest into the aisle, is of lesser magnitude than the magnitude of the width dimension of the pallet. Thus, when a forklift operator wishes to store a pallet on, for example, a second level of the racking, the operator must first lift the pallet load to a height which is greater than the height of the second level of the racking before the pallet enters the racking. Then the forklift operator can drive the pallet into the second level of the racking as desired.

When a forklift operator drives the pallet sufficiently far into the racking, the forklift itself enters the aisle. And since the edges of the horizontal rail portions extend relatively far into the aisles and thus since the aisles are relatively narrow, portions of the forklift vehicles traveling down the aisles, namely the rollcages, are susceptible to contact with horizontal rail portions.

Since the rows tend to be commonly used to store product all of a single, or various few, kind/sku, the height levels at which the L-shaped rails are installed is generally constant along the entire length of any particular row e.g. on both sides of any aisle. Thus, when a forklift operator makes multiple passes down the same aisle, the operator subjects the same portion of the rollcage to contact with the horizontal rail portion. Over time, the contact on that portion of the roll cage is cut into, and/or material is otherwise removed, by the horizontal rail portion.

In other words, as the driver drives the pallet along the length of the aisle, thus to put the pallet in the stack or upon the rack, or to remove the pallet from the stack or rack, the driver focuses his/her attention on the pallet, and drives the forklift so as to facilitate movement of the pallet relative to the racking. Meantime, the cage of the forklift is only a little narrower than the space between the side racking elements, namely the horizontal rail portions.

As a result, since the driver is concentrating on the movement and condition of the pallet, not on the movement of the forklift per se, the cage routinely scrapes along the edge of the horizontal member of the racking at the first level.

Since all of the racking within an aisle, and sometime within a warehouse, is built at a common height, the scraping on the cage is all at a given height on the cage uprights. While the racking horizontal rail portion is not per se sharp, it is relatively thin and strong, whereby repeated, and/or prolonged scraping of the cage uprights on the racking causes the racking to cut into the cage uprights. If the cage uprights are not properly serviced, one or more of the uprights becomes so worn/cut through that the corresponding upright is no longer able to serve its desired protective function.

Damaged cage uprights cannot be repaired by e.g. welding, under current safety guidelines because of the potential for defects in a field-applied welding process. Accordingly, it is common for forklift operators or owners to replace the cage and/or a cage assembly at regular intervals, at substantial cost to the owner of the forklift. Such costs are measured both in terms of cost of the replacement parts, the cost of the downtime of the machine, and potentially, downtime of the operator.

Therefore, it might prove desirable to provide protective structures, adapted and configured to absorb the scraping by racking, for the rollcages of forklifts. And it might prove desirable to provide replaceable protective structures, for the rollcages of forklifts, to absorb racking scraping.

SUMMARY

This invention provides a forklift rollcage protector which has a housing, attached to a forklift rollcage, and an insert which has a length dimension, an inwardly facing surface and an outwardly facing surface. The inwardly facing surface of the insert communicates with an outwardly facing surface of the housing. The outwardly facing surface of the insert faces generally outwardly away from the housing and the rollcage. The insert removably interfaces with the housing and generally attenuates scraping, cutting, and/or other wear of the rollcage.

In a first family of embodiments, the invention comprehends a forklift rollcage protector, comprising: (a) a housing attached to a such forklift rollcage, the housing having a length dimension, an inwardly facing surface, and an outwardly facing surface; and (b) an insert having a length dimension, an inwardly facing surface and an outwardly facing surface, the insert inwardly facing surface communicating with the housing outwardly facing surface; the insert removably interfacing with the housing.

In some embodiments, the inwardly facing surface of the housing interfacing such forklift rollcage.

In some embodiments, the housing comprises a bracket having an inner surface which defines an outer perimeter of a bracket cavity, the insert removably received into the bracket cavity.

In some embodiments, further comprising a first bracket having an inner surface which defines an outer perimeter of a first bracket cavity, and a second bracket having an inner surface which defines an outer perimeter of a second bracket cavity, the first bracket and the second bracket spaced from each other along the length of the housing.

In some embodiments, the bracket comprises a bottom wall.

In some embodiments, the housing comprises an elongate back-plate which has a length dimension that generally corresponds to the length dimension of the housing and wherein the bracket is hingedly connected to the back-plate.

In some embodiments, the housing is clampingly attached to a such forklift rollcage.

In some embodiments, the housing is weldingly attached to a such forklift rollcage.

In some embodiments, the insert comprises a polymeric material.

In some embodiments, the insert comprises a high density polyethylene material.

In some embodiments, the insert is boltingly secured to the housing.

In some embodiments, the insert is clampingly secured to the housing.

In some embodiments, the insert is slidingly received into the housing.

In a second family of embodiments, the invention comprehends a rollcage protector assembly, comprising: (a) a housing attached to a such rollcage, the housing having an inwardly facing surface and an outwardly facing surface, the outwardly facing surface having a bracket extending outwardly therefrom, the bracket having an inner surface; and (b) an insert having a length dimension, a width dimension, and a thickness dimension; the bracket inner surface generally defining an outermost perimeter of a bracket cavity and the insert removably received into the bracket cavity.

In some embodiments, the length dimension of the insert has a magnitude of at least about 2 inches.

In some embodiments, the length dimension of the insert has a magnitude of at least about 4 inches.

In some embodiments, the thickness dimension of the insert has a magnitude of at least about 0.2 inch.

In some embodiments, the thickness dimension of the insert has a magnitude of at least about 0.5 inch.

In some embodiments, the thickness dimension of the insert has a magnitude of at least about 0.8 inch.

In some embodiments, such rollcage includes a generally upright elongate member and the housing is movably attached to such generally upright elongate member, whereby the housing is movable between a first position and a second position, the first and second positions being separated from each other along the length of such generally upright elongate member.

In some embodiments, the housing is adhesively attached to a such rollcage.

In a third family of embodiments, the invention comprehends a tubing protector assembly for protecting a piece of tubing, comprising: (a) a first elongate protector member; and (b) a second elongate protector member removably interfacing with the first elongate protector member; wherein at least one of the first and second elongate protector members communicates with a such piece of tubing, and at least one of the first and second elongate protector members comprises a polymeric material.

In some embodiments, the first elongate member defines a housing which comprises a bracket having an inner surface which defines an outer perimeter of a bracket cavity.

In some embodiments, the second elongate member defines an insert, the insert sliding received into the bracket cavity.

In some embodiments, the first and second elongate members are generally mirror images of each other.

In some embodiments, the first and second elongate members are boltingly secured to each other.

Figure 1:
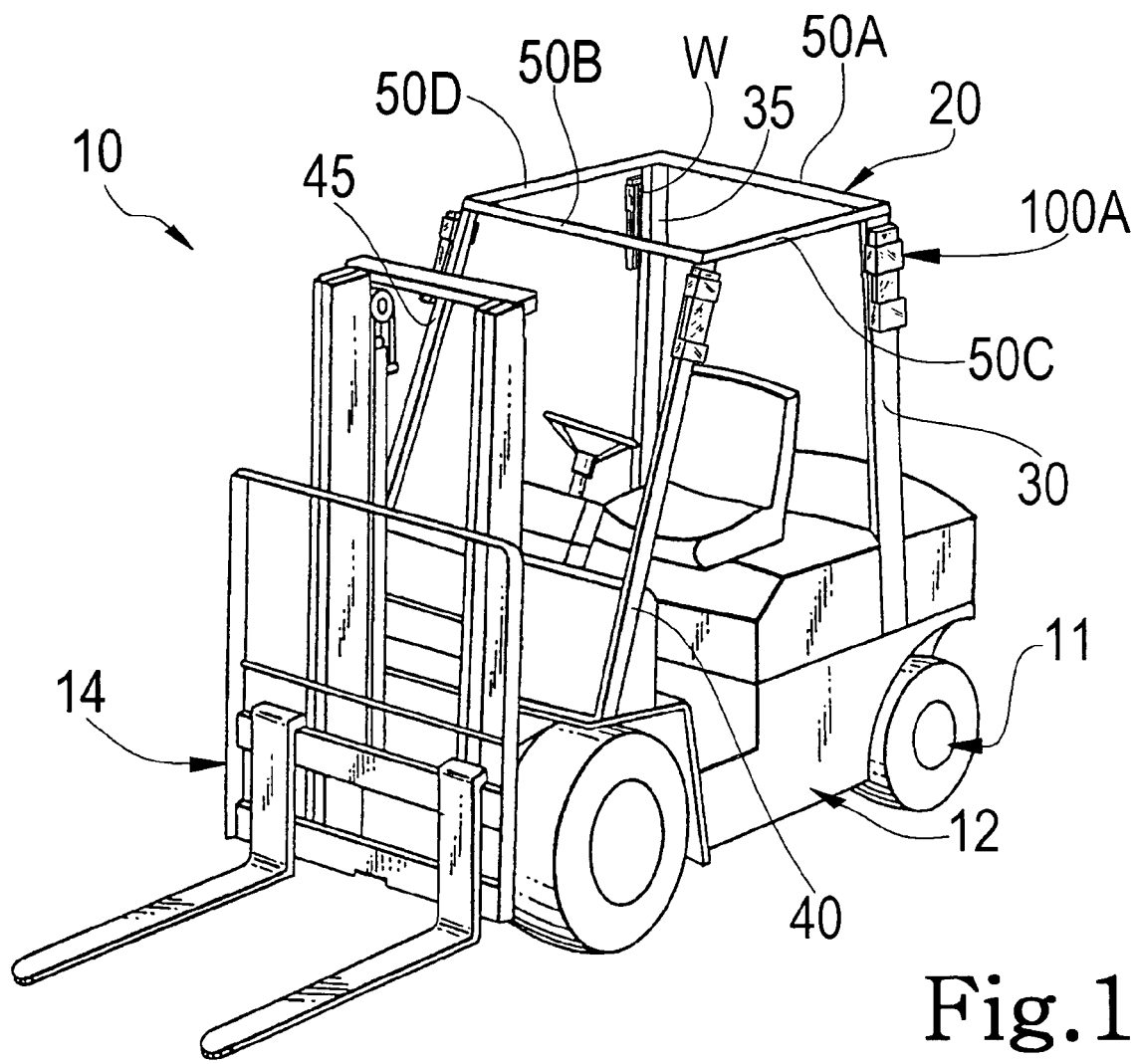
FIG. 1 shows a pictorial view of a first embodiment of forklift rollcage protector assemblies of the invention, installed on a first forklift.

The invention is not limited in its application to the details of construction or the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

FIG. 1 shows a first embodiment of rollcage protector assemblies of the invention. In a typical implementation of the invention, at least one rollcage protector assembly 100A is attached to forklift vehicle 10, namely rollcage 20.

In general, forklift 10 includes carriage 11, body 12, lift mechanism 14, and rollcage 20. Carriage 11 includes at least some of e.g. a vehicle frame, the running gear such as various internal combustion engines, electric motors, transmissions, transaxles, other gearboxes, various suspension components, driveshafts, axles, hubs, wheels, tires, and/or other components. The assemblage of carriage 11 generally provides the power for the vehicle and the means to transmit the vehicle power to the driving surface, e.g. the ground or floor.

Body 12 includes a variety of body panels, shells, seats, and/or other accessories which generally enclose the mechanicals of carriage 11. Thus, body 12 generally provides protection to the mechanicals of the remainder of forklift 10, and generally protects the operator, and others nearby, from exposure to e.g. various moving or otherwise dangerous parts.

Lift mechanism 14 generally defines the "fork" of the forklift and is attached to carriage 11 and/or body 12. Namely, lift mechanism 14 includes, for example, metallic prongs or forks which are adapted and configured to, along with other components, lift, carry, and/or otherwise manipulate, palletized loads, e.g. loads which are on pallets. In addition, lift mechanism 14 includes a generally vertically positioned and oriented boom which is adapted and configured to lift and lower the forks, and thus pallets, generally upwardly and downwardly.

Figure 2:
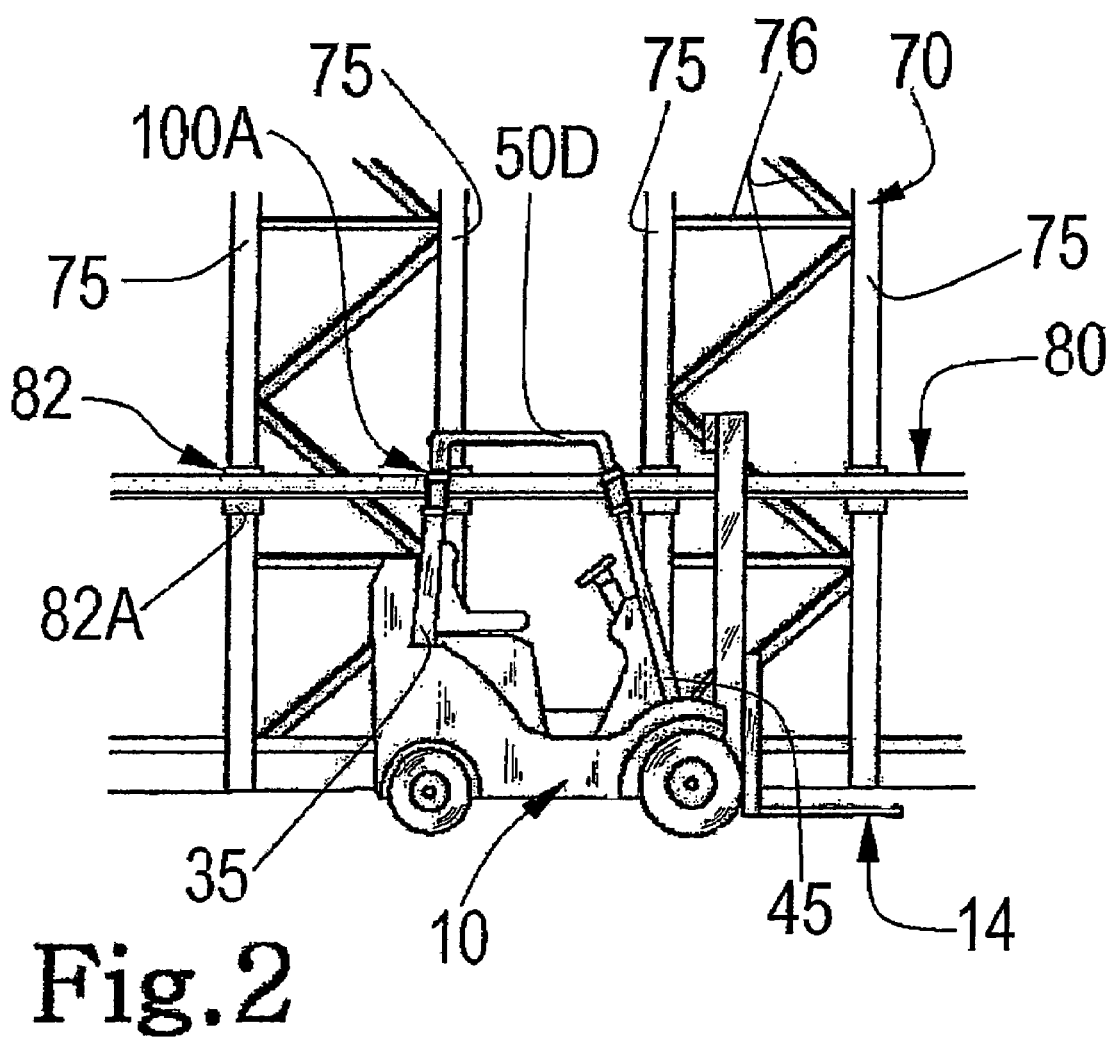
FIG. 2 shows a side elevation view of a second forklift, in an aisle of pallet racking, with forklift rollcage protector assemblies of the invention installed thereupon.

Rollcage 20 is attached to carriage 11 and/or body 12, and generally provides protection to the operator of forklift 10. As illustrated, rollcage 20 includes rear uprights 30, 35, front uprights 40, 45, and roof members 50A, 50B, 50C, and 50D. Each of rear uprights 30, 35 is an elongate member which has a first end connected to carriage 11 and/or body 12. Each of rear uprights 30, 35 extends generally upwardly and vertically, for example generally perpendicularly with respect to the ground such as illustrated in FIG. 1, or at a generally non-perpendicular angle with respect to the ground such as illustrated in FIG. 2, optionally others.

Each of front uprights 40, 45 is an elongate member which has a first end connected to carriage 11 and/or body 12. Each of rear uprights 40, 45 extends generally upwardly and vertically, for example at a generally non-perpendicular angle with respect to the ground such as illustrated in the FIGURES, optionally generally perpendicularly with respect to the ground (not illustrated), optionally others.

Roof members 50A, 50B, 50C, and 50D generally connect rear and front uprights 30, 35, 40, and 45 to each other. Roof member 50A is an elongate member which extends between rear upright 30 and rear upright 35. Thus, a first end of roof member 50A is connected to the uppermost end of rear upright 30 and a second, opposite, end of roof member 50A is connected to the uppermost end of rear upright 35.

Roof member 50B extends generally parallel to roof member 50A. A first end of roof member 50B is connected to the uppermost end of front upright 40 and. a second, opposite, end of roof member 50B is connected to the uppermost end of front upright 45.

Roof member 50C extends generally perpendicularly between respective ends of roof members 50A and 50B. A first end of roof member 50C is connected to the uppermost end of rear upright 30 and a second, opposite, end of roof member 50C is connected to the uppermost end of front upright 40.

Roof member 50D extends generally perpendicularly between respective ends of roof members 50A and 50B, and extends generally parallel to roof member 50C. A first end of roof member 50D is connected to the uppermost end of rear upright 35 and a second, opposite, end of roof member 50D is connected to the uppermost end of front upright 45.

Accordingly, roof members 50A, 50B, 50C, and 50D collectively define a generally rectangular roof frame structure. The uprights, e.g. rear uprights 30, 35 and front uprights 40, 45, extend downwardly from the roof frame structure and connect the roof frame structure to the remainder of forklift vehicle 10, whereby the overall assemblage of rollcage 20 generally provides a safety enclosure for the operator of forklift vehicle 10.

Ones of the components of rollcage 20 are made from materials which are suitably strong, resilient, durable, and have other characteristics suitable for the intended use life in the intended environment. Exemplary to such materials are various metallic materials, and/or compounds, such as aluminum, steel, their various alloys, and/or others. Also, the components of rollcage 20 can be in a variety of configurations. As one example, ones of rear uprights 30, 35, front uprights 40, 45, and roof members 50A, 50B, 50C, and 50D can be tubular structures e.g. rectangular or circular tubing, alternatively solid structures such as solid round, square, or other stock, alternatively angle-iron, channel-iron, I-beam, and/or other stock. Accordingly, references herein to tubing, or other specific e.g. structures or types of stock, apply equally as well to all other suitable material types and configurations.

Figure 3:
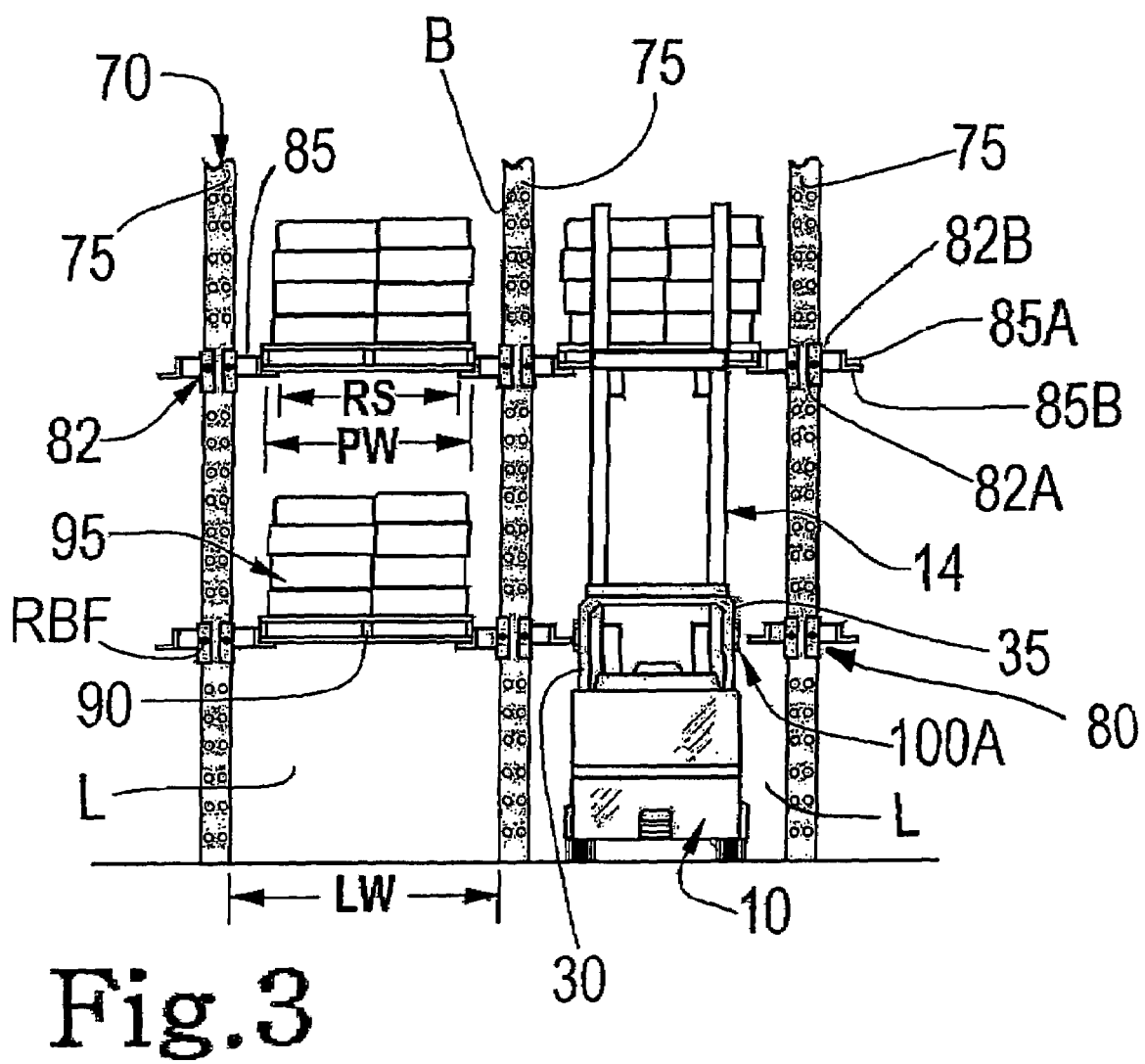
FIG. 3 shows a rear elevation view of the forklift of FIG. 2, lifting a pallet load for receipt into a pallet rack, with forklift rollcage protector assemblies of the invention installed thereupon.
Figure 4:
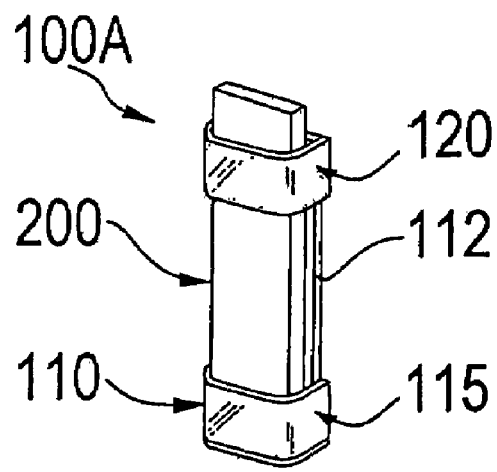
FIG. 4 shows an enlarged, pictorial, view of one of the forklift rollcage protector assemblies of FIG. 1.

Referring now to FIG. 3, forklift 10 is adapted and configured to lift, lower, carry, transport and/or otherwise manipulate e.g. pallet 90, for example in a warehouse environment. Warehouse environments typically include series of racking structures, e.g. racking assembly 70, which includes various components including, but not limited to, racking upright members 75, racking cross-members 76, and pallet support rail assemblies 80.

FIGS. 2 and 3 illustrate a warehouse style racking configured in a drive-in or drive-through configuration. Racking upright members 75 are elongate members which extend generally upwardly, perpendicularly from the floor of the warehouse. As visible in FIG. 3, a plurality of through bores "B" extend through ones of upright members 75, which enable various other components to racking assembly 70 to be bolted, pinned, and/or otherwise attached, to the upright members.

Cross-members 76 extend between and connect various adjacent pairs of upright members 75 (FIG. 2). As desired, cross-members 76 extend generally perpendicularly, and/or otherwise angularly between, the various adjacent pairs of upright members 75, so as to provide the suitable levels of weight, rigidity, strength, durability, bracing, and/or other desired characteristics of racking assembly 70.

Multiple ones of the pairs of the upright members, connected by cross-members 76, are generally coplanarly aligned. In other words, a plurality of upright members 75, spaced from each other, extends along a generally straight line path, and thereby defines a generally elongate column or generally open wall, e.g. the series of upright members 75 generally defines one side of a lane or aisle such as lane "L." The other side of the same, respective, lane or aisle is generally defined by another elongate column or generally open wall which is defined by a plurality of upright members 75 which are spaced from each other and extend along a generally straight line path. FIG. 2 shows a side view of a portion of one elongate column or generally open wall.

Referring now to FIG. 3, each of lanes "L" is an elongate void which generally extends between and is defined by adjacent ones of elongate columns consisting of the upright members 75. The operator of forklift 10 drives the forklift into, out of, and/or through lanes "L" and correspondingly e.g. stores loads therein or removes loads therefrom. Typically, each of lanes "L" is used to store product all of a single, or various few, kind/sku, whereby like products are stored proximate each other.

Lane "L" has an opening width dimension "LW" which is greater in magnitude that the magnitude of the width of forklift 10. Also, lane "L" has a length dimension (not labeled) which extends generally perpendicularly to the lane width dimension. A portion of the length dimension (not labeled) of lane "L" is illustrated in FIG. 2, where the width dimension "LW" is illustrated and labeled in FIG. 3.

Referring now to FIGS. 2 and 3, pallet support rail assembly 80 includes support rail brackets 82 and pallet rails 85, and is adapted and configured to at least partially bear the weight of e.g. pallet 90 and/or load 95. Support rail brackets 82 provide, at least partially, the means to attach the support rail assembly 80 to racking assembly 70, and include upright interface 82A and post member 82B. The pallet support rail assemblies 80 extend partially into the respective lanes "L" and generally define separate, vertical, levels or tiers of the racking assembly.

Upright interface 82A is adapted and configured to interface and cooperate with ones of uprights 75, and/or other components of racking assembly 70. Upright interface 82A is elongate, generally L-shaped, and is generally vertically oriented, whereby it appears L-shaped when viewed from above or below. Thus, upright interface 82A has first and second portions which generally perpendicularly interface with each other to collectively define the L-shaped upright interface.

The first portion of upright interface 82A is generally planar, is illustrated in elevation in FIG. 3, has in inner surface and an outer surface, and has a bore which extends therethrough. The inner surface of the first portion is in face to face communication with a corresponding outwardly facing surface of upright member 75. The outer surface of the first portion faces in an opposite direction, namely in the same generally direction as the outwardly facing surface of upright member 75 through which bores "B" extend.

In the complete assemblage of racking assembly 70, the bore through the first portion of upright interface 82A and the bore which extends through the corresponding upright member 75 are generally coaxially aligned. A fastening device, e.g. rail bracket fastener "RBF" extends through the bore of upright interface 82A and the bore of upright member 75, thereby mechanically connecting the upright member 75 and the support rail assembly 80. Therefore, the height or level at which goods and/or other articles are stored upon racking assembly 70 is determined, at least in part, by which particular ones of the bores of upright member 75 and the bores of upright interface 82A are aligned, and thus at which height or level that pallet support rail assembly 80 is attached to the remainder of racking assembly 70.

In some embodiments, upright interface 82A has more than one bore extending therethrough, adapted and configured to cooperate with corresponding multiple bores "B" of upright members 75. In such embodiments, as desired, multiple ones of rail bracket fasteners "RBF" can be used at each upright interface 82A when additional strength, stability, and/or holding power, is desired from multiple fasteners on a single rail bracket.

The second portion of upright interface 82A is generally planar and is illustrated in elevation in FIG. 2. The second portion of upright interface 82A has in inner surface, an outer surface, and first and second lateral edges. One of the first and second lateral edges of the second portion is attached to a corresponding lateral edge of the first portion of upright interface 82A.

The inner surface of the second portion of upright interface 82A is in face to face communication with a corresponding surface of upright member 75 which faces toward lane "L." The outer surface of the second portion of upright interface 82A faces in an opposite direction. Namely, the outer surface of the second portion faces toward lane "L" instead of toward upright member 75 like the inwardly facing surface. The outwardly facing surface, which faces toward lane "L," is connected to post member 82B.

Post member 82B is generally elongate, and extends from upright interface 82A into lane "L." The end of post member 82B which is not connected to upright interface 82A is connected to pallet rail 85.

Pallet rail 85 is an elongate L-bracket, angle-iron, or other shelf-type structure, which extends along the length of lane "L." Pallet rail 85 includes first and second portions or segments, namely vertical rail member 85A and horizontal rail member 85B, each of which extends generally along the length of lane "L."

Vertical rail members 85A are generally planar and have inwardly facing surfaces and outwardly facing surfaces which are generally perpendicular to the ground. The inwardly facing surface of each vertical rail member 85A faces upright members 75, and the outwardly facing surface of rail member 85A faces toward lane "L." Post members 82B are attached to the inwardly facing surface of vertical rail member 85A at various loci, spaced from each other, along the length of the vertical rail member 85A, thereby connecting pallet rail 85 to the remainder of the pallet support rail assembly 80.

Horizontal rail members 85B are generally planar and protrude, jut, and/or otherwise extend, partially into lane "L." The rail members 85B have upper and lower surfaces which are generally parallel to the ground, an inner edge, an outer edge. The inner edge of each horizontal rail member 85B is fixed to a lower portion of vertical rail member 85A.

In the complete assemblage of racking assembly 70, corresponding pairs of pallet support rail assemblies 80, on opposite sides of respective, common, lanes "L," each define a space between the individual rail assemblies within the pair. In other words, within a cooperative pair of rail assemblies 80, the outer edge of a first horizontal rail member 85B and the outer edge of a second horizontal rail member 85B, namely the edges which extend furthest into lane "L," generally define a space therebetween, e.g. rail space "RS." The magnitude of the distance between rail assemblies 80, which generally defines rail space "RS," corresponds to the width of a pallet to be stored thereupon. Namely, rail space "RS" defines an opening distance between the rails which is lesser in magnitude that the width dimension of a pallet to be stored thereupon.

Accordingly, the rail assemblies 80, in each respective pair, cooperate to at least partially define receiving structure to accept, for example, pallet 90 therein and/or thereupon. In the receiving structure, the upper surfaces of horizontal rail members 85B interface with the bottom surface of pallet 90. Vertical rail members 85A provide lateral, mechanical boundaries which facilitate suitable lateral placement of pallet 90 over rail assemblies 80, and resist non-desired lateral shifting of pallet 90 when it is stored upon the rail assemblies.

Pallet 90 is a typical pallet, e.g. a wooden, portable, platform adapted and configured for storing, holding, and/or to facilitate moving, objects, loads, and/or other goods such as load 95. Load 95 comprehends various suitable objects, loads, and/or other goods, which include, but are not limited to, single SKU loads, mixed-case loads, and/or others.

In a typical warehouse environment, lane width "LW" is greater in magnitude than the width dimension of forklift 10, which permits the forklift 10, with pallet 90, to travel down the length of lane "L." Rail space "RS" is greater in magnitude than the width dimension of forklift 10, which again permits the forklift 10, with pallet 90, to travel down the length of lane "L." Accordingly, lane width "LW" is also greater in magnitude than the width dimension PW of pallet 90 and load 95. However, rail space "RS" is lesser in magnitude that the width dimension PW of pallet 90, which enables the rail assemblies 80 to support, store, and/or otherwise hole, pallet 90 thereupon. Thus, an operator of forklift 10 must raise pallet 90 and load 95 to the desired height of storage before entering lane "L."

Referring now to FIGS. 1, 2, 3, 4, 5, 6, 7A, 7B, 7C, 8, and 9, rollcage protector assembly 100A, B, C, D, E, F is attached to forklift vehicle 10, at or adjacent rollcage 20, and offers at least some protection to rollcage 20 from e.g. grinding, scraping, cutting, abrading, and/or other wear.

Referring now to FIGS. 4, 5, 6, 7A, 7B, and 7C, rollcage protector assembly 100A, B, C, includes first and second protector members, namely housing 110 and insert 200. Housing 110 has a length dimension, a width dimension, and inwardly facing surface and an outwardly facing surface. And in the embodiments of FIGS. 4, 5, 6, 7A, 7B, and 7C, housing 110 includes back-plate 112, lower bracket 115, and upper bracket 120.

Back-plate 112, of housing 110, is a generally planar, elongate, member. Back-plate 112 has an inwardly facing surface and an outwardly facing surface. The inwardly facing surface of back-plate 112 generally corresponds to the inwardly facing surface of housing 110, and is adapted and configured to communicate with portions of forklift 10, e.g. rollcage 20. The outwardly facing surface of back-plate 112 faces a generally opposite direction and therefore faces generally outwardly away from forklift 10 when the rollcage protector assembly 100A, B, C, D is installed thereto.

Figure 5:
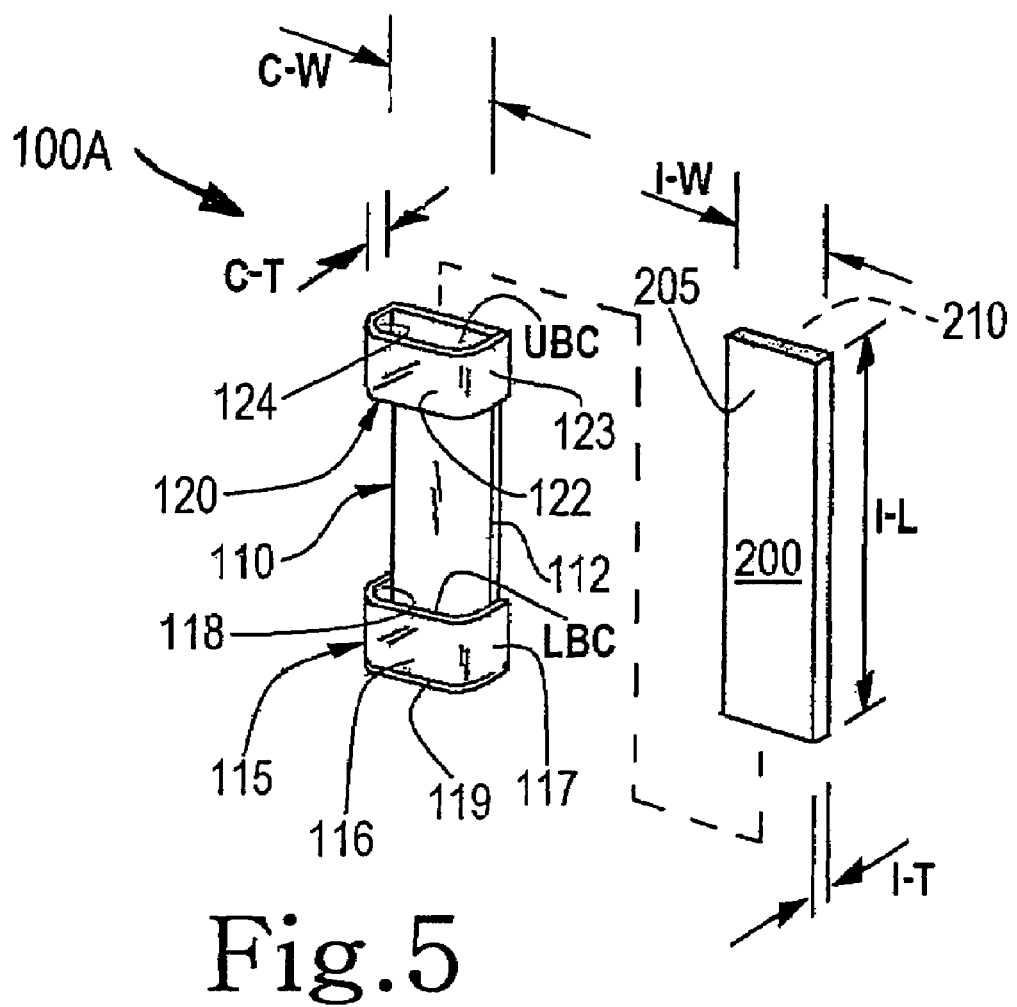
FIG. 5 shows an enlarged, pictorial, exploded view of one of the forklift rollcage protector assemblies of FIG. 1.

Referring now to FIG. 5, lower bracket 115 includes outer wall 116, sidewalls 117, 118, and bottom wall 119. Outer wall 116 is generally planar and has inwardly and outwardly facing surfaces, lateral edges, and extends generally parallel to back-plate 112. The inwardly facing surface of outer wall 116 faces toward the outwardly facing surface of back-plate 112. These two facing surfaces, and thus back-plate 112 and outer wall 116, are spaced from each other and generally define a void therebetween.

Each of sidewalls 117 and 118 is a generally planar member with an inwardly facing surface, an outwardly facing surface, and extends generally perpendicularly outwardly away from back-plate 112, away from forklift 10.

Sidewall 117 extends outwardly away from a first lateral edge of back-plate 112, and generally connects to a first lateral edge of outer wall 116. Sidewall 118 extends outwardly away from a second lateral edge of back-plate 112, and generally connects to a second lateral edge of outer wall 116. The inwardly facing surfaces of sidewalls 117, 118 face each other, thus sidewalls 117 and 118 are spaced from each other and define a void therebetween, which is generally in common with the void defined between back-plate 112 and outer wall 116.

Bottom wall 119 is a generally planar member and has an upper surface and a lower surface. Bottom wall 119 is generally parallel to e.g. the ground and extends outwardly away from back-plate 112. In other words, the bottom surface of bottom wall 119 generally faces e.g. the ground while the upper surface faces toward the remainder rollcages protector assembly 100A, B, C, E. The perimeter of the upper surface of bottom wall 119 communicates with the bottom edges of ones of outer wall 116, sidewall 117, and sidewall 118. Thus, bottom wall 119 generally provides closure structure for the lower portion of lower bracket 115.

The upper portion of lower bracket 115 remains generally open and this opening is adapted and configured to receive objects, such as insert 200, therein and/or therethrough. Accordingly, the outwardly facing surface of back-plate 112, the inwardly facing surface of outer wall 116, the inwardly facing surfaces of sidewalls 117 and 118, and the upper surface of bottom wall 119, in combination, generally define an outer perimeter of a void space or cavity, e.g. lower bracket cavity "LBC."

Upper bracket 120 includes outer wall 122, sidewalls 123, 124 but no bottom wall 119. Outer wall 122 is generally planar has inwardly and outwardly facing surfaces, lateral edges, and extends generally parallel to back-plate 112. The inwardly facing surface of outer wall 122 faces toward the outwardly facing surface of back-plate 112. These two facing surfaces, and thus back-plate 112 and outer wall 122 are spaced from each other and generally define a void therebetween.

Each of sidewalls 123 and 124 is a generally planar member with an inwardly facing surface, an outwardly facing surface, and extends generally perpendicularly outwardly away from back-plate 112, away from forklift 10.

Sidewall 123 extends outwardly away from a first lateral edge of back-plate 112, and generally connects to a first lateral edge of outer wall 122. Sidewall 124 extends outwardly away from a second lateral edge of back-plate 112, and generally connects to a second lateral edge of outer wall 122. The inwardly facing surfaces of sidewalls 123, 124 face each other, and sidewalls 123 and 124 are spaced from each other and define a void therebetween, which is generally in common with the void defined between back-plate 112 and outer wall 122.

The upper and lower portions of upper bracket 120 remain generally open, thereby defining an upper opening and a lower opening. These openings are adapted and configured to receive objects, such as insert 200, therein and/or therethrough. Accordingly, the outwardly facing surface of back-plate 112, the inwardly facing surface of outer wall 122, and the inwardly facing surfaces of sidewalls 123 and 124, in combination, generally defines an outer perimeter of a void space or cavity, e.g. upper bracket cavity "UBC." In other words, an aperture passes generally vertically through the upper bracket 120, and the space defined between the aperture walls corresponds to the outer perimeter of upper bracket cavity "UBC."

Lower bracket "LBC" and upper bracket "UBC" are generally vertically aligned with each other. Accordingly, an imaginary generally straight line path extends through the upper opening of upper bracket 120, through the upper bracket cavity "UBC," out the lower opening of upper bracket 120, parallel to, and along a portion of the length of, back-plate 112, through the opening at the top of lower bracket 115, and into lower bracket cavity "LBC."

Each of lower bracket cavity "LBC" and upper bracket cavity "UBC" defines a cavity width dimension and a cavity thickness dimension, e.g. cavity width dimension "C-W" and cavity thickness dimension "C-T." The magnitude of cavity width dimension "C-W" and cavity thickness dimension "C-T" of lower bracket 115 and the magnitude of cavity width dimension "C-W" and cavity thickness dimension "C-T" of upper bracket 120 may correspond to each other, or may not, depending on the particular configuration of, for example, the particular insert 200 to be housed therein. Thus, lower and upper brackets 115, 120 can have similar, or dissimilar, magnitudes of cavity width dimensions "C-W" and cavity thickness dimensions "C-T," and/or other characteristics and configurations, as desired. Regardless, lower and upper brackets 115, 120, individually or in combination are adapted and configured to e.g. receive, accept, house, retain, and/or otherwise hold, insert 200 therein.

Insert 200 is an elongate, generally rectangular member, although other suitable shapes and configurations are well within the scope of the invention. As illustrated in FIG. 5, insert 200 has a length dimension "I-L," and a width dimension "I-W." Insert 200 has an outwardly facing surface 205 and in inwardly facing surface 210. The outwardly and inwardly facing surfaces 205, 210 generally define an insert thickness dimension "I-T" therebetween.

Insert 200 is adapted and configured to interface with, for example, objects which might otherwise interface with rollcage 20. Such objects include, but are not limited to, pallet support rail assembly 80, and/or other components of racking assembly 70. Thus, insert 200 offers at least some protection to rollcage 20 from impacts, punctures, scrapes, scuffs, scratches, slices, grinds, cuts, abrasions, and/or other wear, damage, or other compromises to the integrity of rollcage 20. In other words, insert 200 is adapted and configured to absorb scraping, cutting, and/or other interfacing contacts which would otherwise be imparted upon rollcage 20.

Insert 200 is made of materials which possess the desired characteristics, features, qualities, traits, and/or other property which enable insert 200 to last for a suitable use-life in the intended environment.

In some embodiments, insert 200 is made of a polymeric material. Exemplary of suitable polymeric materials for use in insert 200 include but are not limited to, various high density polyethylenes. In some embodiment, insert 200 is made of various other ones of the polyethylenes, or various polypropylenes. There can also be mentioned as examples such polymers suitable for use in insert 200 as polyvinyl chloride and chlorinated polyvinyl chloride copolymers, various of the polyamides, polycarbonates, and others.

In some embodiments, insert 200 is made of a non-polymeric material, such as ones of various metallic materials, as desired, such as when relatively greater durability and/or relatively longer use-life is desired as compared to polymeric construction of insert 200. As desired, insert 200 can be made of various metal alloys including, but not limited to, anodized aluminum, aluminum, steel, stainless steel, titanium, magnesium, brass, and their respective alloys.

In the complete assemblage of rollcage protector assembly 100A, B, C, and others, at least a portion of insert 200, e.g. outwardly facing surface 205, is for example, laterally uncovered, visible, accessible, and/or otherwise exposed. Thus, outwardly facing surface 205 and/or other portions of insert 200, such as lateral edges and/or other surfaces, are subject to interfacing with rail assembly 80.

To enable insertion of insert 200 into housing 110, the magnitude of cavity thickness dimension "C-T" of each of lower and upper brackets 115, 120, is relatively greater than the magnitude of insert thickness dimension "I-T." And the magnitude of cavity width dimension "C-W" of each of lower and upper brackets 115, 120 is relatively greater than the magnitude of insert width dimension "I-W." Thus, housing 110 and insert 200 are cooperatively sized and configured to enable insert 200 to be removable held in the housing.

When insert 200 is held in housing 110, the outwardly facing surface of back-plate 112 is in face to face communication with inwardly facing surface 210 of insert 200. The oppositely facing surface of insert 200, namely outwardly facing surface 205, is positioned for wear to its surface, and thus relieves rollcage 20 from such wear. Insert 200 is generally vertically retained, e.g. resists falling downwardly out from housing 110, by the mechanical interface between the lower edge or surface of insert 200 and the upwardly facing surface of bottom wall 119 of the housing.

Insert 200 is generally horizontally and/or laterally retained by the mechanical interfacing relationships between the respective ones of outwardly and inwardly facing surfaces 205, 210, of insert 200, various other edges and surfaces of insert 200, and corresponding inwardly facing surfaces of outer wall 116, sidewalls 117, 118, outer wall 122, and sidewalls 123, 124 of lower and upper brackets 115, 120. In other words, bottom wall 119 of lower bracket 115 prevents insert 200 from falling out of the bottom of housing 110. And brackets 115 and 120 suitably prevent insert 200 from otherwise falling out of housing 110.

Referring now to FIGS. 1, 2, and 3, the position at which rollcage protector assembly 100A is mounted to rollcage 20 corresponds to the distance between a level or tier of pallet support rail assemblies 80 and the ground. A sufficient amount of insert 200 is exposed, when held in housing 110, to enable insert 200, and not rollcage 20, to contact rail assembly 80 despite various environmental and operational factors, fluctuations, and/or other variables and differences.

Example of such factors and operational differences are (i) nominal or other differences in the height of rail assembly 80 along the length of lane "L," (ii) differences in height between separate rail assemblies 80 in different lanes "L," (iii) dynamic suspension compression and extension of forklift 10, in forklifts with suspension components, during its operation which tends to correspondingly dynamically change the distance between rollcage protector assembly 100A and the ground, (iv) changes over time in tire pressure of pneumatic tires on forklift 100A which would change the distance between rollcage protector assembly 100 and the ground, (v) differences in the mass of different pallets 90 and/or loads 95 which would result in different magnitudes of compressions of suspension and/or tire components which would change the distance between rollcage protector assembly 100A and the ground, and/or (vi) other variables which might tend to relatively increase or relatively decrease the distance between rollcage protector assembly 100A and the ground or floor.

Accordingly, in environments in which there is relatively less variation in the distance between rollcage protector assembly 100A and the ground, a user can choose to mount a rollcage protector assembly 100A which exposes relatively less surface area of insert 200. As one example, a relatively shorter insert 200 can be utilized in situations where there is relatively less variation in the distance between rollcage protector assembly 100A and the ground, or where there is less variation between the exact heights of different rail assemblies 80. In such embodiments, the length dimension of insert 200 has a magnitude of at least about 1 inch, optionally at least about 2 inches, optionally at least about 2.5 inches, optionally at least about 3 inches, optionally at least about 3.5 inches, optionally others.

In applications in which there is relatively more variation in the distance between rollcage protector assembly 100A and the ground, a user can choose to mount a rollcage protector assembly 100A which exposes relatively more surface area of insert 200. As one example, a relatively longer insert 200 can be utilized in situations where there is relatively more variation in the distance between rollcage protector assembly 100A and the ground, or where there is more variation between the exact heights of different rail assemblies 80. In such embodiments, the length dimension "I-L" of insert 200 has a magnitude of at least about 4 inches, optionally at least about 4.5 inches, optionally at least about 5 inches, optionally others.

The thickness dimension of insert 200 is selected based, at least in part, on the intended use environment of the rollcage protector assembly and/or the desired temporal scope of the use-life of insert 200. Thus, when the rollcage protector assembly 100A, 100B, 100C, 100D, 100E and 100F is subjected to relatively more interfacing contact, e.g. grinding, scraping, cutting, abrading and/or other wear stresses, insert 200 is relatively thicker. Or, when a relatively longer use-life of insert 200 is desired, insert 200 is relatively thicker so as to enable relatively more grinding, scraping, cutting, abrading and/or other wear stresses, before the insert requires replacement. Exemplary of various suitable insert thickness dimensions "I-T" include, but are not limited to, at least about 0.2 inch, optionally at least about 0.5 inch, optionally at least about 0.8 inch, optionally at least about 1 inch, optionally others.

Regardless of the exact relative dimensions of embodiments of insert 200, insert 200 is adapted, sized, and configured to cooperate with, and be held in, housing 110. As desired, insert 200 can be relatively loosely housed in housing 110. Or as desired, insert 200 can be relatively tightly housed in housing 110, such as by friction fit or otherwise.

Figure 7A:
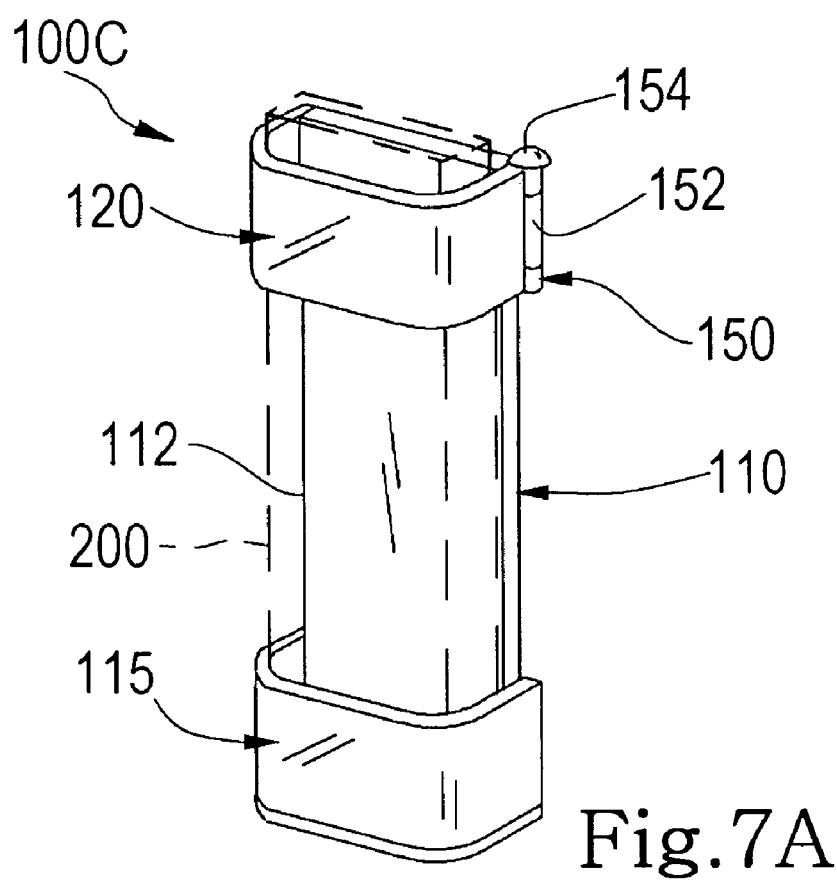
FIG. 7A shows a pictorial view of a third embodiment of forklift rollcage protector assemblies of the invention.
Figure 7B:
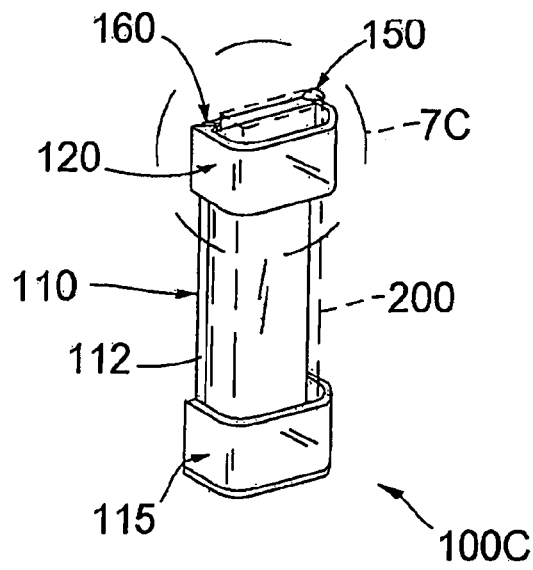
FIG. 7B shows a pictorial view of a fourth embodiment of forklift rollcage protector assemblies of the invention.
Figure 7C:
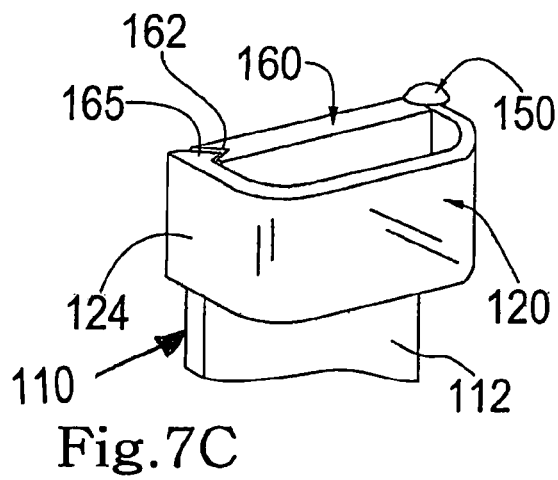
FIG. 7C shows an enlarged, pictorial, view of a portion of the protector assembly of FIG. 7B.

Referring now to FIGS. 7A, 7B, and 7C, also as desired, housing 110 can include hinge assembly 150 which enables the housing to, for example, clampingly hold insert 200 or to facilitate removal, insertion, and/or securement of the insert 200 whether or not insert 200 is loosely, snuggly, or tightly, held in housing 110.

Referring to FIG. 7A, the hinge assembly 150 includes hinge barrel 152 and hinge pin 154 and hingedly attaches e.g. upper bracket 120 to back-plate 112. Hinge barrel 152 includes a plurality of cylindrical members, each with a bore that extends axially therethrough. Ones of the cylindrical members are attached to near the top of back-plate 112, adjacent an outer edge of the back-plate. Other ones of the cylindrical members are attached to upper bracket 120, e.g. adjacent terminal edges of the respective bracket sidewall 123 or 124.

The cylindrical members of hinge assembly 150 are coaxially aligned with each other and positioned generally parallel to back-plate 112, whereby the individual bores of the respective cylindrical members collectively define a through bore which extends through the entirety of hinge assembly 150. Hinge pin 154 extends axially through the bore of hinge assembly 150 and generally defines an axis of pivotation of the hinge assembly. Accordingly, hinge pin 154 mechanically and pivotably couples the cylindrical members to each other so as to define a hinged connection between back-plate 112 and upper bracket 120.

Referring now to FIGS. 7B and 7C, in some embodiments, rollcage protector assembly 100C further includes clasp mechanism 160, which enables upper bracket 120 to securingly interface with back-plate 112, when the upper bracket 120 is hingedly connected thereto. Clasp mechanism 160 includes receiving depression 162 and bracket protrusion 165.

Receiving depression 162 is a kerf, channel, and/or other depression, which extends into a lateral outer edge of back-plate 112, partially along the length of back-plate 112. Receiving depression 162 is adapted and configured to cooperate with bracket protrusion 165 and, for example, snap-lockingly receive the protrusion therein.

Bracket protrusion 165 extends outwardly from and along the length of the inwardly facing surface of sidewall 124, adjacent to the outer edge of sidewall 124. As illustrated, bracket protrusion 165 includes first and second ramped surfaces. The first and second ramped surfaces of bracket protrusion 165 intersect sidewall 124 at different angles of intersection.

The ramped surface nearest the outer edge of sidewall 124 defines an angle of intersection of relatively lesser magnitude than the magnitude of the angle of intersection of the ramped surface which is distal the sidewall outer edge. Accordingly, it is relatively easier to urge clasp mechanism 160 into the closed, secured, position than it is to urge clasp mechanism 160 open. This correspondingly decreases the likelihood of non-desired hinge opening of the upper bracket 120. To open a bracket which incorporates hinge assembly 150 and clamp mechanism 160, the user pulls the terminal end of sidewall 124 outwardly away from housing 112 which flexes bracket 120 sufficiently far to create adequate clearance between receiving depression 160 and bracket protrusion 165, whereby bracket 120 can be hingedly opened by e.g. pivotation about hinge pin 154.

Figure 8:
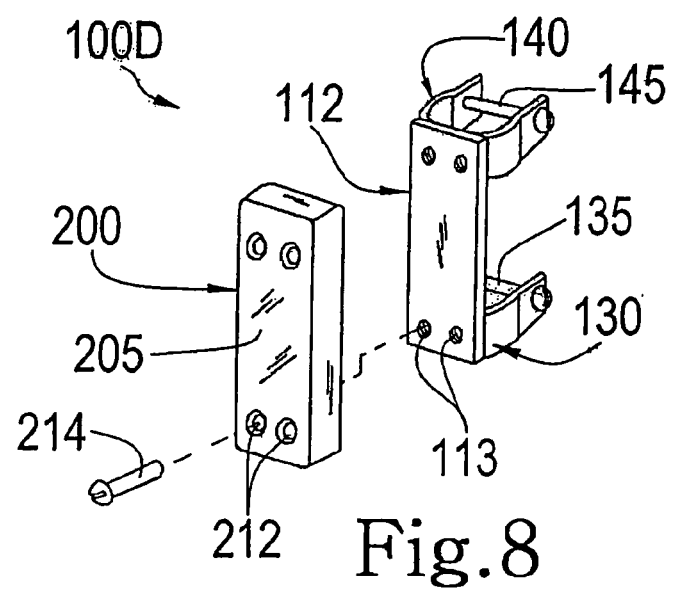
FIG. 8 shows a pictorial view of a fifth embodiment of forklift rollcage protector assemblies of the invention.

In the alternative to holding insert 200 by way of brackets, e.g. lower and upper brackets 115, 120, insert 200 can be boltingly secured to back-plate 112, such as in the embodiment of rollcage protector assembly 110D illustrated in FIG. 8. Back-plate 112 of rollcage protector assembly 110D includes one or more threaded bores 113 which extend generally perpendicularly therethrough. The insert 200 includes one or more through bores 212 which extend generally perpendicularly therethrough. In the assemblage of rollcage protector assembly 110D, the through bores 212 of insert 200 and the threaded bores 113 of back-plate 112 are generally coaxially aligned. A bolt 214 extends through each of the bores 212, and threadedly secures into one of the threaded bores 113. As desired, bores 212 can include a counter-sunk surface which enables the head of bolt 214 to be generally housed within insert 200, and not extend outwardly from outwardly facing surface 205. Thus, when desired, threaded bores 113, through bores 212, and bolts 214, can be used in lieu of, or in addition to, lower and upper brackets 115, 120.

Referring now to FIGS. 1, 2, 3, 4, 5, 7A, 7B, and 7C, rollcage protector assembly 100A, 100B and 100C is secured to rollcage 20 by means of welding. FIG. 1 illustrates such attachment at weldment "W" which joins back-plate 112 to ones of uprights 30, 35, 40, and 45. Weldment "W" results from any of a variety of suitable welding methods and materials such as electrodes and other welding consumables. Such suitable welding processes and methods include, but are not limited to, shielded metal arc welding, gas tungsten arc welding, gas metal arc welding, and/or others.

Figure 6:
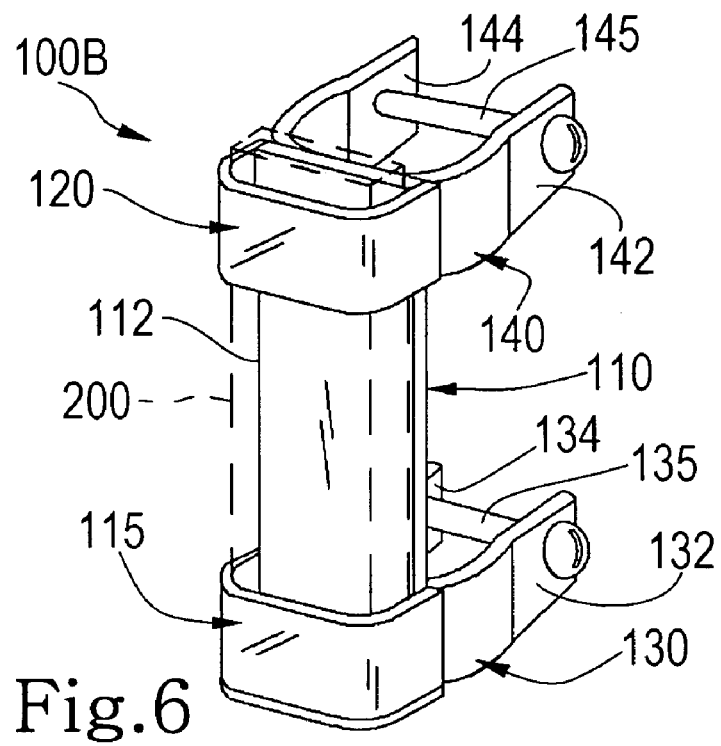
FIG. 6 shows a pictorial view of a second embodiment of forklift rollcage protector assemblies of the invention.

In the embodiments of FIGS. 6 and 8, rollcage protector assembly 100B, 100D is secured to rollcage 20 by means of lower mounting clamp 130 and upper mounting clamp 140, in lieu of, or in addition to, weldment "W." Lower mounting clamp 130 includes clamp lobes 132, 134 and bolt 135. Each of lobes 132 and 134 has in inwardly facing surface, and each extends generally perpendicularly from the inwardly facing surface of back-plate 112 and is adapted and configured to resiliently, grippingly, and/or otherwise frictionally interface portions of rollcage 20.

A bore extends through the end of each of lobes 132 and 134 of lower clamp 130, which is most distal back-plate 112. The bore which extends through lobe 132 and the bore which extends through lobe 134 are generally coaxial with each other. Bolt 135 extends through the bores of each of lobe 132 and 134, and is adapted and configured to draw the unsecured ends of the lobes 132 and 134, namely the ends which are not secured to back-plate 112, relatively nearer to each other.

The inwardly facing surfaces of the lobes 132 and 134 grippingly interface the outer surface of respective ones of uprights 30, 35, 40, and 45. When bolt 135 is tightened, lobes 132 and 134 correspondingly tighten about the respective ones of uprights 30, 35, 40 and 45. Accordingly, when bolt 135 is sufficiently tightened, lower clamp 130 sufficiently tightens upon the respective upright so as to at least partially prevent non-desired movement of rollcage protector assembly 100B, 100D thereupon.

Upper mounting clamp 140 includes clamp lobes 142, 144 and bolt 145. Each of lobes 142 and 144 has in inwardly facing surface, and each extends generally perpendicularly from the inwardly facing surface of back-plate 112 and is adapted and configured to resiliently and/or grippingly interface portions of rollcage 20.

A bore extends through the end of each of lobes 142 and 144 of upper clamp 140, in particular, the end of each of lobes 142 and 144 which is most distal back-plate 112. The bore which extends through lobe 142 and the bore which extends through lobe 144 are generally coaxial with each other. Bolt 145 extends through the bores of each of lobe 142 and 144, and is adapted and configured to draw the unsecured ends of lobe 142 and 144, namely the ends which are not secured to back-plate 112, relatively nearer to each other.

The inwardly facing surfaces of the lobes 142 and 144 grippingly interface the outer surface of respective ones of uprights 30, 35, 40, and 45. When bolt 145 is tightened, lobes 142 and 144 correspondingly tighten about the respective ones of uprights 30, 35, 40 and 45. Accordingly, when bolt 145 is sufficiently tightened, upper clamp 140 sufficiently tightens upon the respective upright so as to at least partially prevent non-desired movement, e.g. sliding, rotation, and/or other movement, of rollcage protector assembly 100B, 100D upon the respective upright of rollcage 20.

Figure 9:
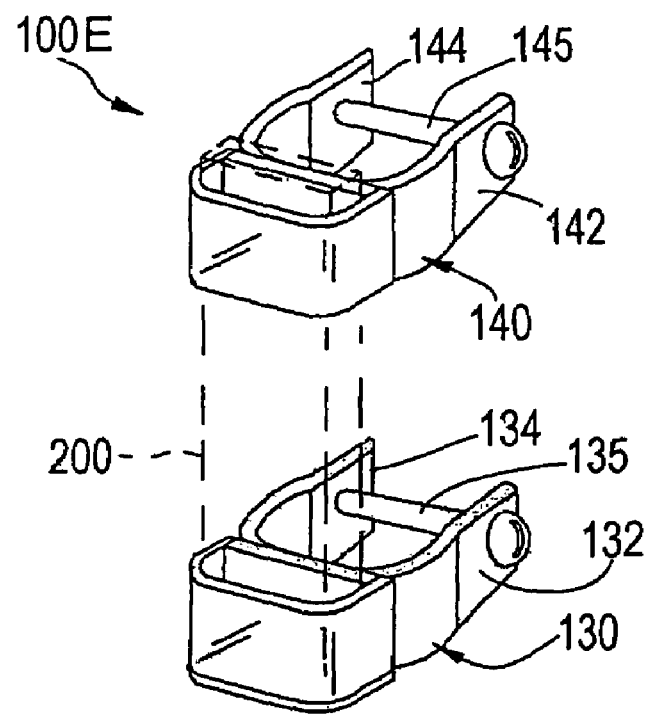
FIG. 9 shows a pictorial view of the forklift rollcage protector assembly of FIG. 6, without the back-plate.

Referring now to FIG. 9, rollcage protector assembly 100E is an analog of rollcage protector assembly 100B, but without back-plate 110. Thus, whereas lower bracket 115 and upper bracket 120 of protector assembly 110B are relatively spatially fixed with respect to each other, lower bracket 115 and upper bracket 120 of protector assembly 110E are adapted and configured to move with respect to each other. In other words, when desired, a user can loosen bolt 135 and/or 145 and move lower bracket 115 and/or upper bracket 120 relatively nearer to or relatively further from each other. Then the user can re-tighten bolt 135 and/or 145 to again clampingly secure lower and upper clamps 130, 140, and thus lower and upper brackets 115, 120 to a respective upright of rollcage 20.

In some embodiments, in lieu of, or in addition to, attaching the rollcage protector assembly to rollcage 20 by means of weldment "W" and/or mounting clamps 130, 140, other suitable mounting methods and, when required, hardware are utilized. As one example, those skilled in the art are well aware of various adhesives which are suitable for joinder between like and dissimilar metallic materials, and between non-metallic materials and metallic materials. Such adhesives include, but are not limited to, various methacrylate structural adhesives, elastomeric-epoxies, thixotropic-epoxies, and/or other epoxies and other adhesives.

In some embodiments, other suitable hardware components and configurations are utilized. As one example, in lieu of, or in addition to, mounting clamps 130 and 140, the rollcage protector assembly can include one or more threaded posts which extend generally perpendicularly outwardly away from the inwardly facing surface of back-plate 112. To install such protector assembly, the user drills one or more holes through rollcage 20, inserts the treaded post of the protector assembly therethrough, and e.g. secures the protector assembly to the rollcage by corresponding hardware such as a suitable threaded-nut.

Figure 10:
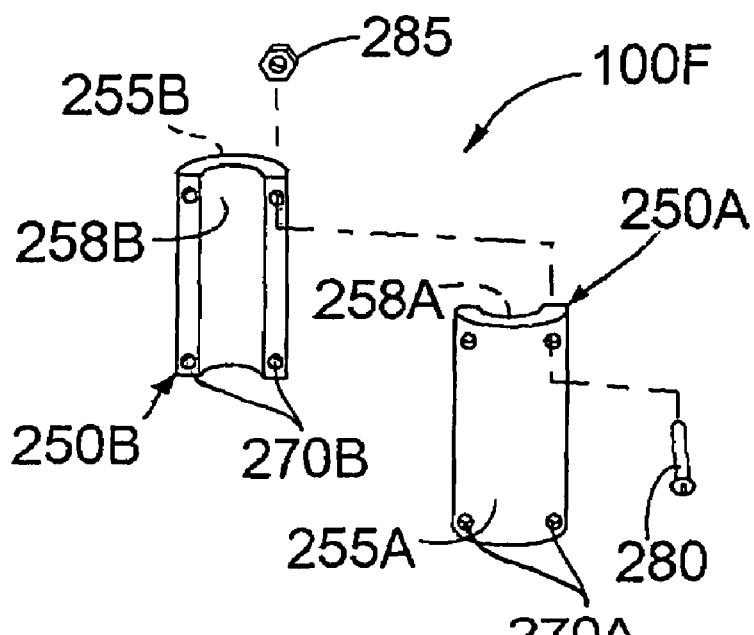
FIG. 10 shows a pictorial view of a sixth embodiment of forklift rollcage protector assemblies of the invention.

Referring now to FIG. 10, in some embodiments the first and second protector members of the rollcage protector assembly perform both the wear absorption function and the mounting function. Exemplary of such embodiments is rollcage protector assembly 100F. The rollcage protector assembly 100F includes first and second protector members 250A and 250B, bolt 280 and nut 285. As illustrated, first and second protector members 250A and 250B are substantially mirror images of each other.

Each of protector members 250A and 250B has a length, an outwardly facing surface 255A, 255B, and an inwardly facing surface 258A, 258B. Bores 270A extend through protector member 250A, between the outwardly and inwardly facing surfaces 255A and 258A. And bores 270B extend through protector member 250B, between the outwardly and inwardly facing surfaces 255B and 258B. In use of the complete assemblage of protector assembly 100F, respective ones of bores 270A and bores 270B are generally coaxially aligned with each other.

Bolts 280 pass axially through the respective, aligned, pairs of bores 270A, 270B. The terminal end of bolt 280 extends outwardly beyond outer surface 255B of protector member 250B, which enables bolt 280 to threadedly engage nut 285. In some embodiments, bores 270B have a threaded inner-circumferential surface. In such embodiments, bolts 280 can threadedly engage bores 270B, whereby the use of nuts 285 is optional.

When bolts 280 are sufficiently tightened, first and second protector members 250A, 250B are urged toward each other, whereby inner surfaces 250A, 250B clampingly, grippingly and/or otherwise frictionally engage the respective upright of rollcage 20.

To use rollcage protector assemblies 100A, 100B, 100C, 100D, 100E and 100F, the user first determines the desired height at which the protector assemblies will be installed upon rollcage 20. Thus, the user determines the distance from the floor or ground at which the potentially scraping, cutting, or other potentially rollcage damaging object, such as rail member 85B of support rail assembly 80, is mounted.

The user then positions the rollcage protector assemblies 100A, 100B, 100C, 100D, 100E and 100F, upon rollcage 20A at the desired height, position, location, and/or orientation. The user attaches the rollcage protector assemblies 100A, 100B, 100C, 100D, 100E and 100F, to rollcage 20 by way of, for example, weldment "W," clampingly tightening mounting clamps 130, 140, clampingly tightening first and second protector members 250A, 250B, and/or other suitable methods such as through utilization of various adhesives, hardware, and others.

After a sufficient amount of use and thus a sufficient amount of contact with rail assembly 80, the e.g. outwardly facing surface of one of the protector members, such as outwardly facing surface 205, outwardly facing surface 255A, or outwardly facing surface 255B, becomes sufficiently worn so that replacement might prove desirable. The user can replace worn ones of insert 200, or protector members 250A, 250B with new ones of insert 200, or protector members 250A, 250B.

Or, if desired, a user of rollcage protector assemblies 100A, 100B, 100C, 100D and 100E, can remove the worn insert 200 from brackets 130 and 140, rotate the insert so that inwardly facing surface 210 then faces outwardly, and place the insert back into brackets 130, 140. In so doing, the user exposes a relatively un-worn surface of insert 200 to the impacts, punctures, scrapes, scuffs, scratches, slices, grinds, cuts, abrasions, and/or other wear-type damage caused, at least partially, by e.g. contacting rail assembly 80.

If desired, a user of rollcage protector assembly 100F can loosen bolts 280 and rotate the protector assembly 100F about, for example, the upright of rollcage 20 to which it is mounted. Thus, the user can expose a relatively un-wore surface of protector assembly 100F to the impacts, punctures, scrapes, scuffs, scratches, slices, grinds, cuts, abrasions, and/or other wear-type damage caused, at least partially, by e.g. contacting rail assembly 80.

Preferably, rollcage protector assemblies 100A, 100B, 100C, 100D, 100E and 100F are made of materials which resist corrosion, and are suitably strong and durable for normal extended use. Those skilled in the art are well aware of certain metallic and non-metallic materials which possess such desirable qualities, and appropriate methods of forming such materials.

Appropriate metallic materials for components of rollcage protector assemblies 100A, 100B, 100C, 100D, 100E and 100F include, but are not limited to, anodized aluminum, aluminum, steel, stainless steel, titanium, magnesium, brass, and their respective alloys. Common industry methods of forming such metallic materials include casting, forging, shearing, bending, machining, riveting, welding, powdered metal processing, extruding and others.

Non-metallic materials suitable for components of rollcage protector assemblies 100A, 100B, 100C, 100D, 100E and 100F, e.g. insert 200, protector members 250A, 250B, and others, are various polymeric compounds, such as for example and without limitation, various of the polyolefins, such as a variety of the polyethylenes, e.g. high density polyethylene, or polypropylenes. There can also be mentioned as examples such polymers as polyvinyl chloride and chlorinated polyvinyl chloride copolymers, various of the polyamides, polycarbonates, and others.

For any polymeric material employed in structures of the invention, any conventional additive package can be included such as, for example and without limitation, slip agents, anti-block agents, release agents, anti-oxidants, fillers, and plasticizers, to control e.g. processing of the polymeric material as well as to stabilize and/or otherwise control the properties of the finished processed product, also to control hardness, bending resistance, and the like.

Common industry methods of forming such polymeric compounds will suffice to form non-metallic components of rollcage protector assemblies 100A, 100B, 100C, 100D, 100E and 100F. Exemplary, but not limiting, of such processes are the various commonly-known plastics converting processes.

Rollcage protector assemblies 100A, 100B, 100C, 100D, 100E and 100F are preferably manufactured as individual components, and the individual components assembled as sub-assemblies, including but not limited to, housing 110, mounting brackets 130, 140, insert 200, and others. Each of the aforementioned sub-assemblies is then assembled to respective other ones of the sub-assemblies to develop assembly rollcage protector assemblies 100A, 100B, 100C, 100D, 100E and 100F.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A forklift rollcage protector, comprising:
   a) a housing attached to said forklift rollcage, said housing including a back plate having an upper bracket and a spaced apart lower bracket, said upper bracket having a cavity formed therethrough and said lower bracket having a cavity formed therein which is closed by a bottom wall, and said back plate having a length dimension, an inwardly facing surface and an outwardly facing surface; and
   b) an insert having a length dimension, an inwardly facing surface and an outwardly facing surface, said insert being removably positioned within said upper and lower brackets of said back plate, an end of said insert contacting said bottom wall of said cavity formed in said lower bracket, and said inwardly facing surface of said insert faces said outwardly facing surface of said back plate.

2. The forklift rollcage protector of claim 1 wherein said inwardly facing surface of said back plate faces said forklift rollcage.

3. The forklift rollcage protector of claim 1 wherein said outwardly facing surface of said back plate defines a portion of an outer perimeter of each of said cavities.

4. The forklift rollcage protector of claim 1 wherein said upper and lower brackets are vertically aligned with each other, said cavity formed in said upper bracket has a width dimension and a thickness dimension, and said cavity formed in said lower bracket has a width and a thickness dimension, and said width and thickness dimensions of said cavity formed in said upper bracket corresponds with said width and thickness dimensions of said cavity formed in said lower bracket.

5. The forklift rollcage protector of claim 1 wherein said wall said upper and lower brackets are vertically aligned with each other, said cavity formed in said upper bracket has a width dimension and a thickness dimension, and said cavity formed in said lower bracket has a width and a thickness dimension, and said width and thickness dimensions of said cavity formed in said upper bracket do not correspond with said width and thickness dimensions of said cavity formed in said lower bracket.

6. A forklift rollcage protector as in claim 3 wherein said housing comprises an elongate back-plate which has a length dimension that generally corresponds to the length dimension of said housing and wherein said bracket is hingedly connected to said back-plate.

7. A forklift rollcage protector as in claim 1 wherein said housing is clampingly attached to a such forklift rollcage.

8. The forklift rollcage protector of claim 1 wherein said outwardly facing surface of said back plate is welded to said forklift rollcage.

9. The forklift rollcage protector of claim 1 wherein said insert comprises a polymeric material.

10. The forklift rollcage protector of claim 1 wherein said insert comprises a high density polyethylene material.

11. A forklift rollcage protector as in claim 1 wherein said insert is boltingly secured to said housing.

12. A forklift rollcage protector as in claim 1 wherein said insert is clampingly secured to said housing.

13. The forklift rollcage protector of claim 1 wherein an end of said insert is capable of sliding completely through said cavity formed in said upper bracket.

14. A rollcage protector assembly, comprising:
   a) a housing attached to said rollcage, said housing including a back plate having an upper bracket and a vertically spaced apart lower bracket, said upper bracket having a cavity formed therethrough and said lower bracket having a cavity formed therein which is closed by a bottom wall, said back plate having an inwardly facing surface and an outwardly facing surface, and said outwardly facing surface being secured to said rollcage; and
   b) an insert having a length dimension, a width dimension and a thickness dimension, said insert being removably positioned within said upper and lower cavities of said upper and lower brackets, respectively, and an end of said insert contacting said bottom wall of said cavity formed in said lower bracket.

15. The rollcage protector assembly of claim 14 wherein the length dimension of said insert has a magnitude of at least about 2 inches and said inwardly facing surface of said insert faces said outwardly facing surface of said back plate.

16. The rollcage protector assembly of claim 14 wherein the length dimension of said insert has a magnitude of at least about 4 inches and said cavity formed in said upper bracket has a width dimension and a thickness dimension, and said cavity formed in said lower bracket has a width and a thickness dimension, and said width and thickness dimensions of said cavity formed in said upper bracket corresponds with said width and thickness dimensions of said cavity formed in said lower bracket.

17. The rollcage protector assembly of claim 14 wherein the thickness dimension of said insert has a magnitude of at least about 0.2 inch and said cavity formed in said upper bracket has a width dimension and a thickness dimension, and said cavity formed in said lower bracket has a width and a thickness dimension, and said width and thickness dimensions of said cavity formed in said upper bracket corresponds with said width and thickness dimensions of said cavity formed in said lower bracket.

18. The rollcage protector assembly of claim 14 wherein the thickness dimension of said insert has a magnitude of at least about 0.5 inch and said cavity formed in said upper bracket has a width dimension and a thickness dimension, and said cavity formed in said lower bracket has a width and a thickness dimension, and said width and thickness dimensions of said cavity formed in said upper bracket do not correspond with said width and thickness dimensions of said cavity formed in said lower bracket.

19. The rollcage protector assembly of claim 14 wherein the thickness dimension of said insert has a magnitude of at least about 0.8 inch and said insert is constructed of high density polyethylene.

20. A rollcage protector assembly as in claim 14 wherein such rollcage includes a generally upright elongate member and said housing is movably attached to such generally upright elongate member, whereby said housing is movable between a first position and a second position, said first and second positions being separated from each other along the length of such generally upright elongate member.

21. The rollcage protector assembly of claim 14 wherein said outwardly facing surface of said back plate is welded to said rollcage.

22. A rollcage protector assembly as in claim 14 wherein said housing is clampingly attached to a such rollcage.

23. A rollcage protector assembly as in claim 14 wherein said housing is adhesively attached to a such rollcage.

* * * * *